United States Patent
Cambon et al.

(10) Patent No.: US 11,322,034 B2
(45) Date of Patent: May 3, 2022

(54) METHOD AND SYSTEM FOR GENERATING OPERATIONAL DATA RELATING TO AIRCRAFT MOVEMENTS IN AN AIRPORT INFRASTRUCTURE

(71) Applicant: AIRBUS SAS, Blagnac (FR)

(72) Inventors: Guillaume Cambon, La Salvetat Saint-Gilles (FR); Abdelmouise Rochdi, Gzoula (MA)

(73) Assignee: AIRBUS SAS

( * ) Notice: Subject to any disclaimer, the term of this patent is extended or adjusted under 35 U.S.C. 154(b) by 163 days.

(21) Appl. No.: 16/717,219

(22) Filed: Dec. 17, 2019

(65) Prior Publication Data

US 2020/0219409 A1 Jul. 9, 2020

(30) Foreign Application Priority Data

Jan. 8, 2019 (FR) ...................... 19 00155

(51) Int. Cl.
*G08G 5/06* (2006.01)
*G05D 1/02* (2020.01)
*G08G 5/00* (2006.01)

(52) U.S. Cl.
CPC .......... *G08G 5/065* (2013.01); *G05D 1/0202* (2013.01); *G08G 5/0013* (2013.01); *G08G 5/0026* (2013.01)

(58) Field of Classification Search
CPC .... G08G 5/065; G08G 5/0013; G08G 5/0026; G05D 1/0202
See application file for complete search history.

(56) References Cited

U.S. PATENT DOCUMENTS 5,375,058 A * 12/1994 Bass .................... G05D 1/0083
                                                  342/450
5,448,243 A *  9/1995 Bethke ................. G01S 13/931
                                                    342/59
5,574,648 A    11/1996 Pilley
(Continued)

FOREIGN PATENT DOCUMENTS

EP           3007152 A1     4/2016

OTHER PUBLICATIONS

Levy, B.S. et al., "Objective and automatic estimation of excess taxi-times.", Inegrated Communications<Navigation and Surveillance Conference, 2008, ICNS 2008, IEEE, Piscataway, NJ, USA, May 5, 2008 (May 5, 2008), pp. 1-10, XP031283424, ISBN: 978-1-4244-2303-3.

(Continued)

*Primary Examiner* — Nicholas Kiswanto
(74) *Attorney, Agent, or Firm* — Lerner, David, Littenberg, Krumholz & Mentlik, LLP

(57) ABSTRACT

The system for generating operational data includes an acquisition module of sets of aircraft movements tracking, an identification module which identifies a path for each aircraft from sets of movement tracking data, at least one runway and at least one parking zone, an identification module which identifies, for each path, phases associated with phase data, a generation module which generates sets of operational data comprising flight data, position data and phase data of each aircraft, and a transmission module which transmits these sets of operational data to a user system.

8 Claims, 3 Drawing Sheets

(56) References Cited

U.S. PATENT DOCUMENTS

| | | | | |
|---|---|---|---|---|
| 8,886,446 B1* | 11/2014 | Baiada | ............... | G06Q 10/0631 |
| | | | | 701/122 |
| 9,076,327 B1* | 7/2015 | Baiada | ................ | G08G 5/0043 |
| 9,437,114 B2* | 9/2016 | Ince | .................... | G08G 5/0065 |
| 9,533,756 B2* | 1/2017 | Cox | ...................... | B64C 25/405 |
| 10,043,401 B2* | 8/2018 | Kathirvel | ............. | G08G 5/0008 |
| 10,210,766 B2* | 2/2019 | Ince | .................... | G08G 5/0065 |
| 10,235,892 B1* | 3/2019 | Colligan | ............. | G08G 5/0026 |
| 10,460,614 B2* | 10/2019 | Jayathirtha | .......... | G08G 5/0078 |
| 2010/0185426 A1* | 7/2010 | Ganesan | ............... | G08G 5/065 |
| | | | | 703/6 |
| 2012/0245836 A1* | 9/2012 | White | ................... | G08G 5/065 |
| | | | | 701/120 |
| 2017/0178420 A1 | 6/2017 | Byrd, Jr. | | |
| 2018/0096612 A1* | 4/2018 | Alphonso | ............. | G08G 5/065 |
| 2020/0090531 A1* | 3/2020 | Baladhandapani | .. | G08G 5/0026 |

OTHER PUBLICATIONS

French Search Report for FR1900155 dated Oct. 17, 2019.

\* cited by examiner

METHOD AND SYSTEM FOR GENERATING OPERATIONAL DATA RELATING TO AIRCRAFT MOVEMENTS IN AN AIRPORT INFRASTRUCTURE

FIELD OF THE INVENTION

The present invention relates to a method and a system for generating operational data to aircraft movements in an airport infrastructure.

BACKGROUND OF THE INVENTION

It is known that systems exist which make it possible to generate operational data of airport infrastructures. By airport infrastructure is meant a set of facilities (runways, parking points, taxiways, etc.) of an airport. Such systems utilize position data and flight data emitted by transponders arranged in aircraft situated on and in proximity to the airport infrastructure. These position and flight data are emitted by the aircraft in flight and on the ground and they are recorded, in real time, in flight tracking databases. On the basis of these position and flight data, said systems extract operational data. By operational data is meant varied information on the operations performed in the airport, for example the time and the use of certain facilities. This information affords details on the global characteristics and the specific constraints of each airport infrastructure.

However, the position data transmitted by aircraft transponders may turn out to be inaccurate. Thus, the position data emitted by an aircraft when stationary may be interpreted as those emitted by an aircraft in motion. The position data of an aircraft parking at a gate may also be interpreted as those emitted by the aircraft at a different gate.

Moreover, the aircraft transponders emit the position data at regular intervals represented by a precise date and a precise time. The operational data arising from the dates and times of emission of erroneous position data are then also falsified.

An interpretation of the operational data may therefore turn out to be incorrect. This usual solution is therefore not completely satisfactory.

BRIEF SUMMARY OF THE INVENTION

Aspects of the present invention may remedy this drawback.

An aspect of the invention relates to a method for generating operational data of at least one airport infrastructure.

According to an aspect of the invention, the method comprises the following steps:
  an acquisition step, implemented by an acquisition module, consisting in acquiring and in transmitting movement tracking data sets for a plurality of aircraft present in a detection volume of predetermined dimensions around the airport infrastructure, each of the movement tracking data sets being associated with one of the aircraft, each of the movement tracking data sets comprising successive position data and flight data of the aircraft considered, a plurality of flight data being associated with each of the position data;
  a first identification step, implemented by a first identification module, consisting in identifying a path for each of the aircraft on the basis of the movement tracking data set of the aircraft considered, of at least one taxiway of the airport infrastructure and of at least one parking zone of the airport infrastructure;
  a second identification step, implemented by a second identification module, consisting in identifying and in transmitting, for each of the paths complying with predetermined conditions, one or more phases, each of the phases being associated with phases data, position data and flight data of each of the aircraft;
  a generation step, implemented by a generation module, consisting in generating a plurality of first sets of operational data and a plurality of second sets of operational data, each of the first sets of operational data comprising the flight data and the phases data associated with one of the aircraft, each of the second sets of operational data comprising the position data of the aircraft; and
  a transmission step, implemented by a transmission module, consisting in transmitting the first sets of operational data and the second sets of operational data to a user system.

Thus, precise operational data are obtained. Indeed, the paths of the aircraft taken into account must satisfy several predetermined criteria which eliminate potentially erroneous positions data and/or flight data. Moreover, splitting the paths of the aircraft into movement phases makes it possible to consider only certain parts of paths. This splitting creates not only an additional filter in the positions and flight data but it also makes it possible to define a new type of data that can be used in the generation of operational data.

Advantageously, the method comprises a first determination step, implemented prior to the first identification step by a first determination module, consisting in determining and in transmitting, on the basis of a first set of infrastructures data comprising coordinates of facilities of the airport infrastructure, at least one taxiway, the first determination step also consisting in transmitting position data of the taxiway or taxiways.

In an advantageous manner, in a particular embodiment, the acquisition step also comprises a selection sub-step, implemented by a selection sub-module, consisting in selecting the movement tracking data sets of each of the aircraft whose number of position data is greater than a predetermined threshold number and to transmit the selected movement tracking sets.

Moreover, advantageously, the method comprises a second determination step, implemented prior to the first identification step by a second determination module, consisting in determining and in transmitting, on the basis of a second set of infrastructures data comprising coordinates of facilities of the airport infrastructure, at least one parking zone, the second determination step also consisting in transmitting position data of the parking zone or zones.

Furthermore, in a particular embodiment, the second determination step comprises the succession of following sub-steps:
  a definition sub-step, implemented by a definition sub-module, consisting in defining, for a plurality of parking points, a search zone around each of the parking points whose coordinates are defined in the second set of infrastructures data;
  a generation sub-step, implemented by a generation sub-module, consisting in generating an aggregate of positions of aircraft that are close to each of the parking points on the basis of training position data satisfying a plurality of predetermined criteria;
  a filtering sub-step, implemented by a filtering sub-module, consisting in eliminating the aggregates of positions of aircraft whose distance between a centre of the aggregate and the closest parking point is greater than a predetermined distance; and an association sub-step, implemented by an association sub-module, consisting in associating each of the aggregates of positions of aircraft which is not eliminated with a parking zone.

Moreover, advantageously, a phase comprises at least:

a first type of phase of movement of an aircraft comprising a journey between a datum of initial position in a first parking zone and a datum of final position in a second parking zone;

a second type of phase of movement of an aircraft comprising a journey between a datum of initial position in a parking zone and a datum of final position in at least one taxiway; and a third type of phase of movement of an aircraft comprising a journey between a datum of initial position in at least one taxiway and a datum of final position in a parking zone.

The present invention also relates to a system for generating operational data of at least one airport infrastructure.

According to an embodiment of the invention, the system comprises:

an acquisition module configured to acquire and to transmit movement tracking data sets for a plurality of aircraft present in a detection volume of predetermined dimensions around the airport infrastructure, each of the movement tracking data sets being associated with one of the aircraft, each of the movement tracking data sets comprising successive position data and flight data of the aircraft considered, a plurality of flight data being associated with each of the position data;

a first identification module configured to identify a path for each of the aircraft on the basis of the movement tracking data set of the aircraft considered, of at least one taxiway of the airport infrastructure and of at least one parking zone of the airport infrastructure;

a second identification module configured to identify and to transmit, for each of the paths complying with predetermined conditions, one or more phases, each of the phases being associated with phases data, position data and flight data of each of the aircraft;

a generation module configured to generate a plurality of first sets of operational data and a plurality of second sets of operational data, each of the first sets of operational data comprising the flight data and the phases data associated with one of the aircraft, each of the second sets of operational data comprising the position data of the aircraft; and a transmission module configured to transmit the first sets of operational data and the second sets of operational data to a user system.

Moreover, advantageously, the system comprises:

a first determination module configured to determine at least one taxiway, on the basis of a first set of infrastructures data and to transmit position data of the taxiway or taxiways; and a second determination module configured to determine at least one parking zone on the basis of a second set of infrastructures data and to transmit position data of the parking zone or zones.

In an advantageous manner, in a particular embodiment, the acquisition module also comprises a selection sub-module configured to select the movement tracking data sets of each of the aircraft whose number of position data is greater than a predetermined threshold number and to transmit the selected movement tracking sets.

Moreover, advantageously, the second determination module comprises:

a definition sub-module configured to define, for a plurality of parking points, a search zone around each of the parking points whose coordinates are defined in the second set of infrastructures data;

a generation sub-module configured to generate an aggregate of positions of aircraft that are close to each of the parking points on the basis of training position data satisfying a plurality of predetermined criteria;

a filtering sub-module configured to eliminate the aggregates of positions of aircraft whose distance between a centre of the aggregate and the closest parking point is greater than a predetermined distance; and an association sub-module configured to associate each of the aggregates of positions of aircraft which is not eliminated with a parking zone.

BRIEF DESCRIPTION OF THE DRAWINGS

The appended figures will elucidate the manner in which the invention may be embodied. In these figures, identical references designate similar elements.

DETAILED DESCRIPTION

Figure 1:
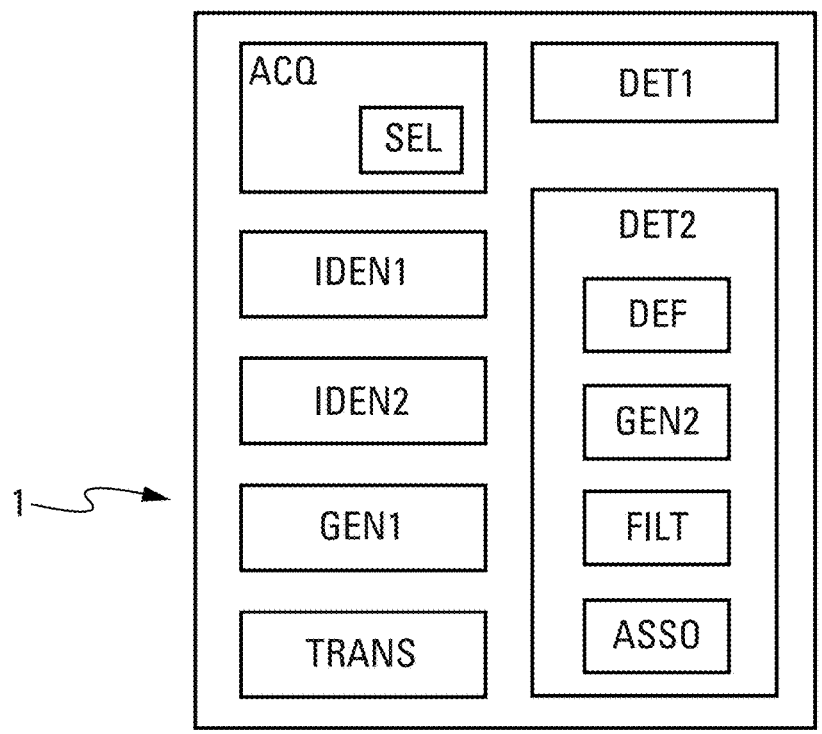
FIG. 1 is a schematic diagram of a particular embodiment of a system for generating operational data of an airport infrastructure.

The system for generating operational data 1 (hereinafter "system 1"), represented schematically in a particular embodiment in FIG. 1, is intended to generate operational data of at least one airport infrastructure.

Within the framework of the present invention, by airport infrastructure is meant the whole set or a part of the facilities present in an airport such as parking points (terminal embarkation/disembarkation gate or bay), gates, runways and trafficways, this list not being exhaustive.

Moreover, by operational data is meant data relating, for example, to the degree of occupancy of a particular runway by a particular type of aircraft AC, the preferential trafficways for accessing or exiting a runway, the mean time spent by an aircraft AC at a gate, the congested trafficways, the types of aircraft AC parking at a particular parking station, etc. The operational data relate to the movements of one or more aircraft AC within and in proximity to an airport infrastructure.

As represented in FIG. 1, the system 1 comprises an acquisition module ACQ which is able to acquire movement tracking data sets from a flight tracking database (not represented).

The flight tracking database records in real time successive position data (that is to say the positions of the aircraft AC at regular temporal intervals) and flight data. These position and flight data are transmitted by a transmission element present in each aircraft AC. The position data and flight data are generally transmitted as long as the aircraft AC is powered up electrically. By way of example, the transmission element of an aircraft AC is a transponder of ADS-B type ("Automatic Dependence Surveillance—Broadcast"). The position data are altitude, longitude and latitude coordinates of the aircraft AC determined by a satellite-based positioning system of GNSS type ("Global Navigation Satellite System"). With each position datum of an aircraft AC are associated flight data which comprise some of the following data: flight number, flight identifier, type of aircraft AC, speed, time, date, serial number of the aircraft AC, etc.

In a preferred embodiment, the acquisition module ACQ is able to acquire, on the basis of the flight tracking database, the successive position data and the flight data of each aircraft AC present in a detection volume (not represented) around the airport infrastructure. The detection volume comprises predetermined dimensions. By way of example, the predetermined dimensions are 17000 feet in height and 30 nautical miles in diameter on the ground.

The position data and the flight data associated with each aircraft AC present in the detection volume form a movement tracking data set.

In a particular embodiment, the acquisition module ACQ also comprises a selection sub-module SEL. This selection sub-module SEL selects, from among the movement tracking data sets acquired by the acquisition module ACQ, the movement tracking data set or sets whose number of position data is greater than a predetermined threshold number. By way of example, the predetermined threshold number is equal to 50.

Figure 3:
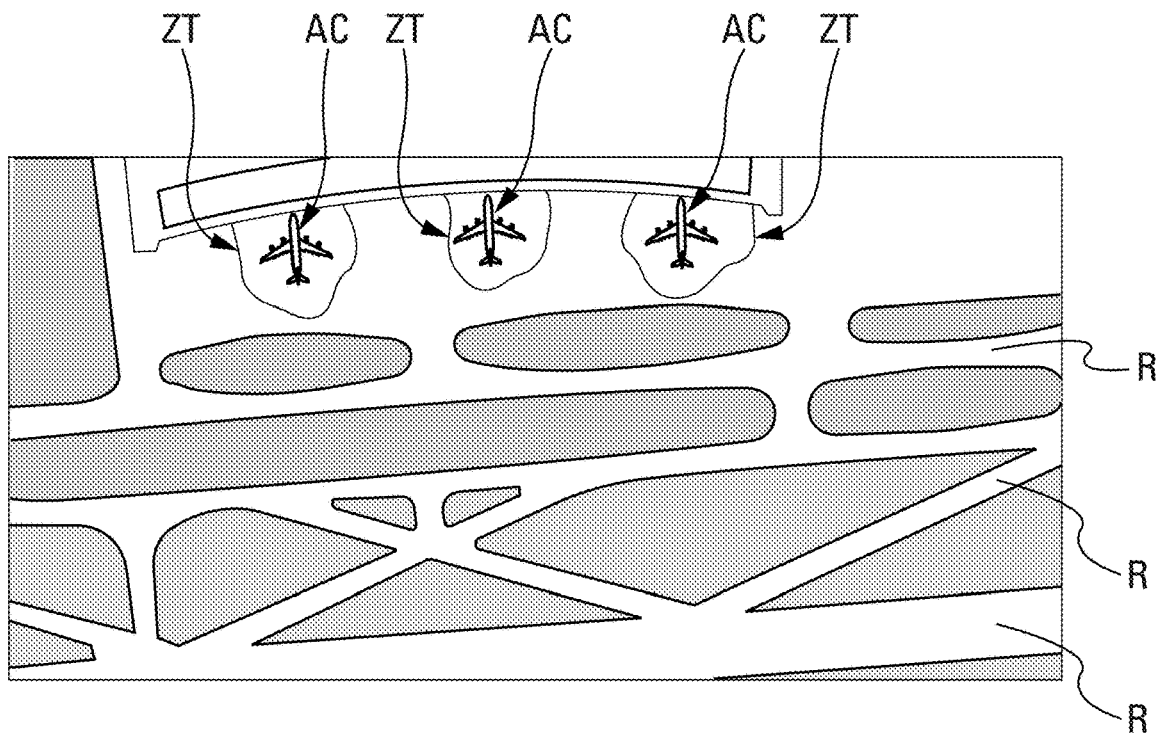
FIG. 3 illustrates a view from above of a part of the facilities of an airport infrastructure.

Moreover, as represented in FIG. 1, the system comprises a determination module DET1 configured to determine one or more taxiways R (see FIG. 3) on the basis of a first set of infrastructures data. This first set of infrastructures data may be included in a database of the airport infrastructure. The first set of infrastructures data comprises latitude and longitude coordinates of certain facilities of the airport infrastructure. These facilities correspond to taxiways R, for example, runways (for landing and for takeoff), trafficways between two runways, etc.

On the basis of the values of the end coordinates of these facilities, the determination module DET1 is able to determine taxiway R position data. These position data are associated with each determined taxiway R. The determination module DET1 is also able to transmit these taxiway R position data.

As represented in FIG. 1, in a preferred embodiment, the system 1 also comprises a determination module DET2. The determination module DET2 is configured to determine one or more parking zones ZT, on the basis of the coordinates of certain facilities of the airport infrastructure. These coordinates form part of a second set of infrastructures data.

This second set of infrastructure data can be integrated into the database of the airport infrastructure. The coordinates of the facilities included in the second set of infrastructures data represent the values of the latitude and of the longitude of parking points Gi with i=1, . . . , N, and N being an integer. The parking points Gi may be embarkation or disembarkation gates (see FIG. 4).

In a particular embodiment, the determination module DET2 comprises a definition sub-module DEF, a generation sub-module GEN2, a filtering sub-module FILT and an association sub-module ASSO.

As represented in FIG. 1, the definition sub-module DEF is configured to define a search zone around each parking point Gi. The probability of presence of the parking point Gi in the search zone is weighted by a Gaussian law centred on the coordinates of the parking point Gi. Values of positions according to a normal law can also be introduced into the probability distribution so as to define the search zone.

Figure 4:
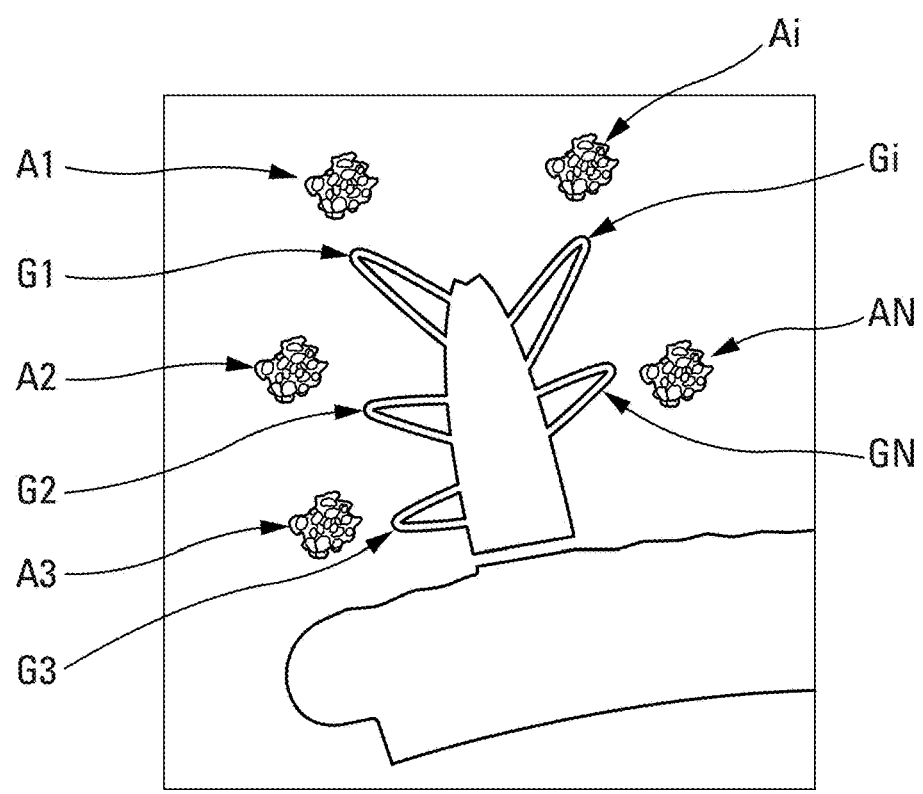
FIG. 4 illustrates a view from above of a set of aggregates of positions of aircraft and of parking points.

Moreover, the generation sub-module GEN2 is configured to generate an aggregate Ai of positions of aircraft with i=1, . . . N. As represented in FIG. 4, each aggregate Ai is generated in proximity to a parking point Gi. The generation of the aggregate Ai of positions of aircraft requires so-called training position data. These training position data represent position data of aircraft AC which satisfy several predetermined criteria. These predetermined criteria are, for example:

the aircraft AC is present on the surface of the airport infrastructure;
the value of the altitude of the aircraft AC is zero;
the value of the speed of the aircraft AC is zero; and
the values of the longitude and latitude coordinates correspond to values of position data of the search zone associated with the parking point Gi.

The training position data can be selected from among position data of the flight tracking database.

Moreover, the filtering sub-module FILT is able to calculate a distance between a centre of the aggregate Ai of positions of aircraft AC, which is generated by the generation sub-module GEN2, and the closest parking point or points Gi. The centre of an aggregate Ai of positions of aircraft AC can have as coordinates, the geometric barycentre of the coordinates of each position of aircraft of the generated aggregate.

The filtering sub-module FILT is configured to eliminate the aggregates Ai of positions of aircraft AC whose distance between their centre and each of the parking points Gi is greater than a predetermined value. This predetermined value is determined statistically for each airport infrastructure. It can correspond to the sum of the standard deviation and of the average of the distances between the centres of the aggregates and each closest parking point Gi.

The association sub-module ASSO is configured to associate each aggregate Ai of positions of aircraft AC, which has not been eliminated by the filtering sub-module FILT, with a parking zone ZT represented by parking zone position data.

Furthermore, the determination module DET2 is able to transmit the parking zone position data.

In another embodiment (not represented), the determination module DET2 determines the parking zones ZT by way of means allowing an operator to identify areas of the airport infrastructure on a map.

Moreover, in a preferred embodiment, the system 1 also comprises an identification module IDEN1. This identification module IDEN1 is able to identify a path for each aircraft AC present in the detection volume. A path is defined on the basis of a movement tracking data set received from the acquisition module ACQ, taxiways position data received from the determination module DET1 and data of the parking zone positions received from the determination module DET2.

Figure 5:
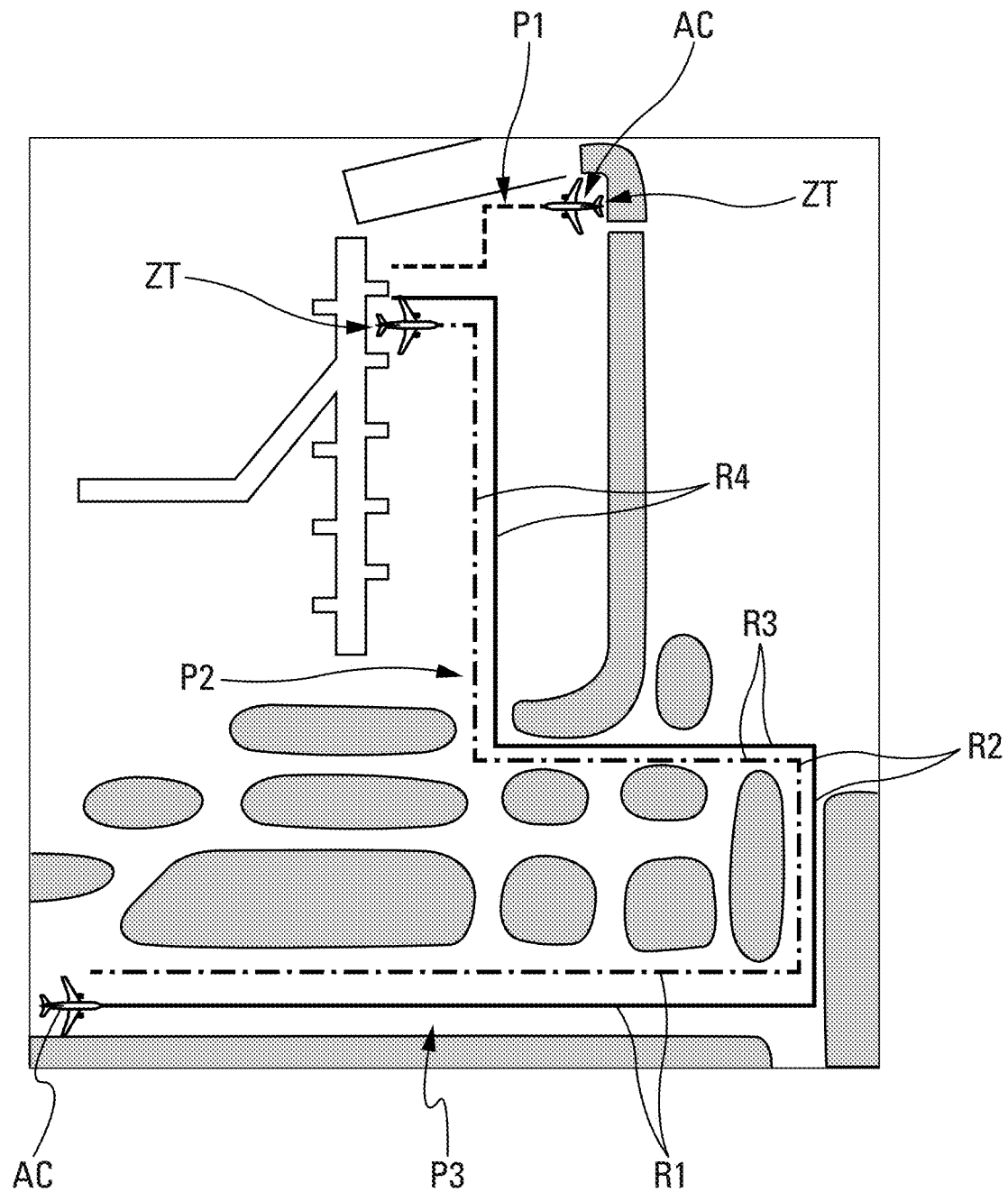
FIG. 5 represents a view from above of various phases of movement of an aircraft in an airport infrastructure part.

Within the framework of this invention, by path is meant a succession of position data emitted by an aircraft AC present in the detection volume and certain of whose position data correspond to taxiways position data and parking zones position data. By way of example, a path represents the landing flight of an aircraft AC on one taxiways R and then continues through a succession of other taxiways R1, R2, R3, R4 up to a parking zone ZT. The path of the aircraft AC continues, for example, through its movement to a different parking zone ZT and finally through a succession of taxiways R with a view to the takeoff of the aircraft AC, as represented in FIG. 5.

By way of example, a path represents the movement of an aircraft AC from a parking zone ZT (a passenger embarkation gate) to a takeoff runway, while passing through a succession of taxiways R (which is not represented).

Furthermore, in a preferred embodiment, the system 1 comprises an identification module IDEN2 configured to identify one or more phases for each path identified by the identification module IDEN1 which satisfies predetermined conditions. One of the predetermined conditions implies that two successive position data of an aircraft AC in motion on a taxiway R must not be associated with data emission times separated by a time greater than a certain threshold value. By way of example, this threshold value is equal to five minutes.

Moreover, a phase is represented by a succession of position data and of flight data representing an aircraft AC. As represented in FIG. 5, a phase can represent:

a first type of phase P1 of movement of an aircraft AC comprising a journey on the ground between a datum of initial position which is situated in a first parking zone ZT and a datum of final position in a second parking zone ZT. By way of example, this type of phase P1 represents the movement of an aircraft AC between two embarkation gates;

a second type of phase P2 of movement of an aircraft AC comprising a journey on the ground between a datum of initial position in a parking zone ZT and a datum of final position in at least one taxiway R. By way of example, this type of phase P2 represents the movement of an aircraft AC from an embarkation gate to a runway with a view to its takeoff; and a third type of phase P3 of movement of an aircraft AC comprising a journey on the ground between a datum of initial position in at least one taxiway R and a datum of final position in a parking zone ZT. This type of phase P3 represents the movement of an aircraft AC from a runway on which it has landed to a disembarkation gate.

By way of example, the movement of an aircraft AC which has landed on a runway, moves up to a gate, for example with a view to the disembarkation of passengers, moves again to another gate, with a view to the embarkation of new passengers and then follows trafficways with a view to a new takeoff is represented by a single path. As represented in FIG. 5, it is also represented by a type of phase P3 of movement, a type of phase P1 of movement and a type of phase P2 of movement.

In a preferred embodiment, the identification module IDEN2 is also configured to associate, with each phase, phases data as a supplement to the position data and flight data associated with the aircraft AC. These phases data can be a phase identifier, a rank of phase in the path of an aircraft AC, a phase start time and a phase end time, a duration of phase, a type of phase, a departure or arrival time at a parking zone ZT or on a taxiway R, etc.

In a preferred embodiment, the system 1 comprises, moreover, a generation module GEN1. This generation module GEN1 is configured to generate sets of operational data, on the basis of the phases data, position data and flight data transmitted by the identification module IDEN2. More particularly, the generation module GEN1 is able to generate a first set of operational data comprising the flight data and the phases data of each aircraft AC and a second set of operational data comprising the position data and at least one identifier of the phase of each aircraft AC.

Moreover, in a preferred embodiment, the system 1 comprises a transmission module TRANS, able to transmit the sets of operational data to a user system. By way of example, a user system is a display unit allowing an operator to view the sets of operational data. The user system can also comprise a memory in which the sets of operational data are recorded.

The system 1, such as described hereinabove, is suitable for implementing a method for generating operational data of at least one airport infrastructure.

Figure 2:
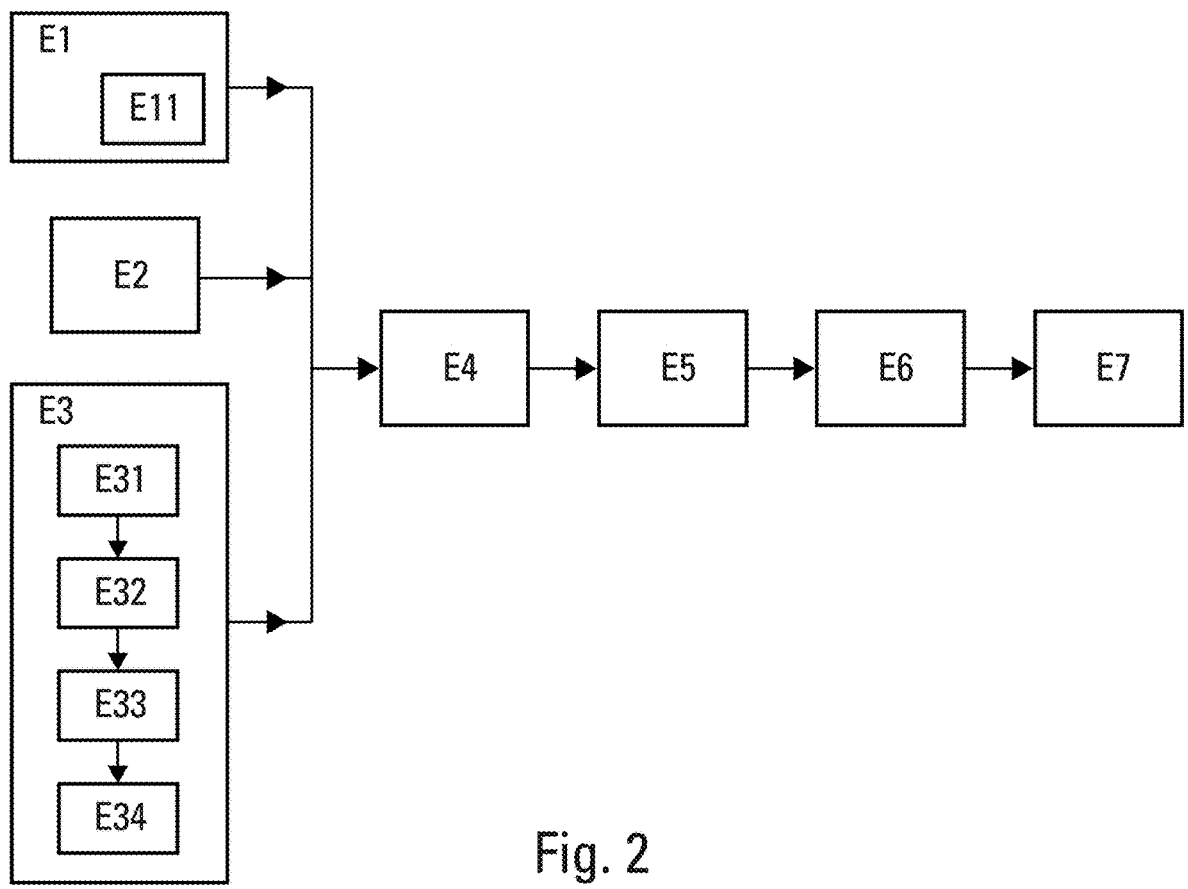
FIG. 2 is a schematic diagram of a particular embodiment of a method for generating operational data of an airport infrastructure.

The method comprises a plurality of steps E1 to E7, as is represented in FIG. 2.

In the course of an acquisition step E1, sets of movement tracking data of aircraft AC present in a detection volume are acquired by the acquisition module ACQ. A movement tracking data set comprises, for a particular aircraft AC, flight data and data of position in the detection volume. Several flight data are associated with each position datum.

The acquisition step E1 comprises, in a particular embodiment, a selection sub-step E11 which consists in selecting each of the sets of movement tracking data of aircraft AC comprising a number of position data greater than a predetermined threshold number. A significant number of position data guarantees that the movements of the aircraft AC in the detection volume are correctly tracked. Moreover, the selection sub-step E11 makes it possible to limit the size of the data transmitted to the identification module IDEN1.

Moreover, several taxiways R are determined in the course of a determination step E2. The surface area of a taxiway R is determined on the basis of a first set of infrastructure data which comprises the coordinates of the ends of the taxiway R and a value of its width.

Furthermore, in the course of a determination step E3, parking zones ZT are determined by the determination module DET2. These parking zones ZT are determined on the basis of a second set of infrastructure data. This second set of infrastructures data comprises coordinates of several facilities some of which are parking points Gi. These parking points Gi may be gates.

In a particular embodiment, represented in FIG. 2, the position data of the parking zones are determined in the course of a plurality of sub-steps E31 to E34 carried out successively for the plurality of parking points Gi.

In the course of a definition sub-step E31, a search zone is defined by the definition sub-module DEF around each parking point Gi. The probability density of presence of a parking point Gi in the search zone follows a Gaussian law centred on the coordinates of the parking point Gi. Moreover, a certain number of presence density values which follow a normal law and which are centred on the values of the coordinates of the parking point Gi are added so as to define the search zone.

Next, during a generation sub-step E32, the generation sub-module GEN2 generates an aggregate Ai of positions of aircraft AC in proximity to or at each parking point Gi, as represented in FIG. 4. The generation of each aggregate Ai is carried out by an automatic learning algorithm which requires training position data. These training position data represent aircraft AC position data satisfying several predetermined criteria. These position data represent in particular aircraft AC with a zero speed and a zero height and present in the search zone.

In the course of a filtering sub-step E33, the distance between a centre of the generated aggregate Ai and the closest parking point Gi is calculated. If the distance is greater than a predetermined distance, the aggregate Ai does not comprise the real position of the parking point Gi and it is eliminated. If the distance is less than the predetermined distance, the aggregate Ai comprises the real position of the parking point Gi. The aggregate Ai is then associated with a parking zone ZT during an association sub-step E34. The position data of the parking zones are then transmitted to the identification module IDEN1.

By considering a parking zone ZT, the determination module DET2 makes it possible to minimize the errors in the position data of each of the aircraft AC by basing itself on the history of the position data of several aircraft AC at each parking point Gi of the airport infrastructure.

In the course of an identification step E4, an aircraft AC path is then identified, by the identification module IDEN1. The path of an aircraft AC is represented by the succession of position data of a movement tracking data set transmitted by the acquisition module ACQ. The path is also identified on the basis of the position data of the taxiways R and of the parking zones ZT transmitted, respectively, by the determination module DET1 and the determination module DET2.

If one or more position data of the aircraft correspond to one or more of the position data of a taxiway R, then, the path of the aircraft AC comprises this taxiway R. Moreover, if one or more position data of the aircraft AC correspond to one or more position data of a parking zone ZT, then the parking zone ZT is included in the path of the aircraft AC. An aircraft AC path can comprise several taxiways R and several parking zones ZT.

As represented in FIG. 2, in the course of an identification step E5, the identification module IDEN2 identifies one or more phases in each of the paths of aircraft AC satisfying certain previously cited predetermined conditions.

An aircraft AC path which satisfies predetermined conditions can represent the aircraft's landing flight on a runway, and then its movement up to a first parking zone ZT (a disembarkation gate). The path continues thereafter with the aircraft's AC journey on the ground to a second parking zone ZT and finally the aircraft's AC journey on the ground to a runway with a view to its next takeoff.

As represented in FIG. 5, the identification module IDEN2 identifies, in this path, several successive phases, namely a type of phase P3, a type of phase P1 and a type of phase P2. By way of example, the types of phases P2 and P3 comprise the aircraft's journey on the ground on the taxiways R1, R2, R3 and R4.

The splitting of each path phase-wise allows a clear identification of the movements of each of the aircraft AC in the airport infrastructure, movements between parking zones ZT in particular.

Moreover, each phase is represented by phases data, as well as the flight data and the aircraft AC position data. These phase, flight and position data are thereafter transmitted to the generation module GEN1.

In the course of a generation step E6, the generation module GEN1 generates first sets of operational data and second sets of operational data.

Each of the first sets of operational data comprises flight data and phases data, associated with an aircraft AC. By way of example, a first set of operational data comprises data representative of the times and dates of entry and of exit of the aircraft AC for a particular parking zone ZT.

Each of the second sets of operational data comprises the position data of each aircraft AC with which a first set of operational data is associated.

These first and second sets of operational data are transmitted, by the transmission module TRANS, in the course of a transmission step E7 to a user system. The user system can be a database, a recording unit, a man/machine interface comprising a screen for viewing the operational data.

On the basis of the first and second sets of operational data, a user can obtain information such as:
- the degree of occupancy of a particular runway by a particular type of aircraft AC;
- the average duration of parking of an aircraft AC, that is to say, between two ground phases;
- the identification of phases between two parking zones ZT;
- the duration of each type of phase P1, P2, P3; and
- the preferential infrastructures used by a type of aircraft AC or an airline.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for generating operational data of at least one airport infrastructure, the method comprising:
an acquisition step, implemented by an acquisition module, including acquiring and transmitting movement tracking data sets for a plurality of aircrafts present in a detection volume of predetermined dimensions around the airport infrastructure, each of the movement tracking data sets associated with one of the plurality of aircrafts, each of the movement tracking data sets comprising successive position data and flight data of the aircraft considered, a plurality of flight data associated with each of the position data;

a first identification step, implemented by a first identification module, including identifying a path for each of the plurality of aircrafts on the basis of the movement tracking data set of the aircraft considered, of at least one taxiway of the airport infrastructure and of at least one parking zone of the airport infrastructure;

a second identification step, implemented by a second identification module, including identifying and transmitting, for each of the paths complying with predetermined conditions, one or more phases, each of the phases associated with phases data, position data and flight data of each of the plurality of aircrafts;

a generation step, implemented by a generation module, including generating a plurality of first sets of operational data and a plurality of second sets of operational data, each of the first sets of operational data comprising the flight data and the phases data associated with one of the plurality of aircrafts, each of the second sets of operational data comprising the position data of the one aircraft; and a transmission step, implemented by a transmission module, including transmitting the first sets of operational data and the second sets of operational data to a user system, wherein the acquisition step further comprises a selection sub-step, implemented by a selection sub-module, including selecting the movement tracking data sets of each of the plurality of aircrafts whose number of position data is greater than a predetermined threshold number and transmitting the selected movement tracking sets.

2. The method according to claim 1, further comprising a first determination step, implemented prior to the first identification step by a first determination module, including determining and transmitting, on the basis of a first set of infrastructures data comprising coordinates of facilities of the airport infrastructure, at least one taxiway, the first determination step also including transmitting position data of the taxiway or taxiways.

3. The method according to claim 1, further comprising a second determination step, implemented prior to the first identification step by a second determination module, including determining and transmitting, on the basis of a second set of infrastructures data comprising coordinates of facilities of the airport infrastructure, at least one parking zone, the second determination step further comprising transmitting position data of the parking zone or zones.

4. The method according to claim 3, wherein the second determination step comprises a succession of:
- a definition sub-step, implemented by a definition sub-module, including defining, for a plurality of parking points, a search zone around each of the parking points whose coordinates are defined in the second set of infrastructures data;
- a generation sub-step, implemented by a generation sub-module, including generating an aggregate of positions of aircraft) which are close to each of the parking points on the basis of training position data satisfying a plurality of predetermined criteria;
- a filtering sub-step, implemented by a filtering sub-module, including eliminating the aggregates of positions of aircraft whose distance between a centre of the aggregate and the closest parking point is greater than a predetermined distance; and
- an association sub-step, implemented by an association sub-module, including associating each of the aggregates of positions of aircraft which is not eliminated with a parking zone.

5. The method according to claim 1, wherein a phase comprises at least:
- a first type of phase of movement of an aircraft comprising a journey between a datum of initial position in a first parking zone and a datum of final position in a second parking zone;
- a second type of phase of movement of an aircraft comprising a journey between a datum of initial position in a parking zone and a datum of final position in at least one taxiway; and
- a third type of phase of movement of an aircraft comprising a journey between a datum of initial position in at least one taxiway and a datum of final position in a parking zone.

6. A system for generating operational data of at least one airport infrastructure, comprising:
- an acquisition module configured to acquire and to transmit movement tracking data sets for a plurality of aircraft present in a detection volume of predetermined dimensions around the airport infrastructure, each of the movement tracking data sets associated with one of the plurality of aircrafts, each of the movement tracking data sets comprising successive position data and flight data of the aircraft considered, a plurality of flight data associated with each of the position data;
- a first identification module configured to identify a path for each of the plurality of aircrafts on the basis of the movement tracking data set of the aircraft considered, of at least one taxiway of the airport infrastructure and of at least one parking zone of the airport infrastructure;
- a second identification module configured to identify and to transmit, for each of the paths complying with predetermined conditions, one or more phases, each of the phases associated with phases data, position data and flight data of each of the aircraft;
- a generation module configured to generate a plurality of first sets of operational data and a plurality of second sets of operational data, each of the first sets of operational data comprising the flight data and the phases data associated with one of the plurality of aircrafts, each of the second sets of operational data comprising the position data of the one aircraft; and
- a transmission module configured to transmit the first sets of operational data and the second sets of operational data to a user system,
wherein the acquisition module further comprises a selection sub-module configured to select the movement tracking data sets of each of the plurality of aircrafts whose number of position data is greater than a predetermined threshold number and to transmit the selected movement tracking sets.

7. The system according to claim 6, further comprising:
- a first determination module configured to determine at least one taxiway, on the basis of a first set of infrastructures data and to transmit position data of the taxiway or taxiways; and
- a second determination module configured to determine at least one parking zone on the basis of a second set of infrastructures data and to transmit position data of the parking zone or zones.

8. The system according to claim 7, wherein the second determination module comprises:
- a definition sub-module configured to define, for a plurality of parking points, a search zone around each of the parking points whose coordinates are defined in the second set of infrastructures data;
- a generation sub-module configured to generate an aggregate of positions of aircraft which are close to each of the parking points on the basis of training position data satisfying a plurality of predetermined criteria;
- a filtering sub-module configured to eliminate the aggregates of positions of aircraft whose distance between a centre of the aggregate and the closest parking point is greater than a predetermined distance; and
- an association sub-module configured to associate each of the aggregates of positions of aircraft which is not eliminated with a parking zone.

* * * * *